Patented Aug. 2, 1927.

1,637,935

UNITED STATES PATENT OFFICE.

DANIEL GARZA, OF NEW ORLEANS, LOUISIANA.

POROUS COMPOSITION BUILDING MATERIAL.

No Drawing.   Application filed April 26, 1926.   Serial No. 104,845.

The present invention relates to improvements in a porous composition building material, which is fire proof sound proof, damp proof, elastic, light, strong, and is a nonconductor of heat, adheres to wood without cracking protecting it against fire and with said material, precast building units and monolithic constructions, plain and reinforced can be made; this material can be nailed, screwed, bolted, bored, sawed as wood can be treated without fracture or splitting; can be colored, painted, plastered with cement mortar or any kind of mortar and decorated in the usual way.

The improved material will be found particularly useful for building domes and for forming separate units as beams, slabs, posts and the like which after formation can be sawed or cut to the desired dimensions, nailed, or otherwise secured together to form the desired structure; also the composition material lends itself readily to molding or casting in situ as a monolithic construction; also can be nailed, screwed, or bolted to wooden frames and wooden posts in a bended or flat slabs shape to protect them against fire.

The scoriaceous basalt or basaltic-tophus-spongeous stone is of volcanic origin, light yet strong and porous, that is to say possessing innumerable cells, which were produced by gases confined within the molten or semi-molten rock during the process of cooling. While very plentiful this stone is restricted in use because it is expensive due to difficulties in working it in shape; for instance a chisel edge merely becomes buried in it and it will not split chip or flake off as does marble. The reason for this is apparently that the cells under the chisel point break down and permit the chisel to enter. The penetration of the tool means merely that the cells in its path break down but lateral pressure, sufficient to split the rock is not generated. To dress the stone for use means to pound the surface until the desired shape is produced. This process has been found unsatisfactory and expensive.

I have proven by tests that the use of fibrous, earthy and bituminous substances are destructive elements in the making of cement concrete, and, hence are to be avoided.

I have also proven that scoriaceous basalt, a porous mineral material to be found in large quantities in volcanic regions, is peculiarly adapted for use as a building material; the scoriaceous basalt in its natural form can not be worked with the usual tools therefore I purpose to treat and combine it with other ingredients to gain a final composition product which will avoid these difficulties and secure the object above stated.

My composition consists of a mixture of a vegetable nonfibrous substance, a crushed mineral filler and a binder.

The invention is concerned with the production of the artificial counterpart of scoriaceous basalt and consists in the following ingredients:

(1) Scoriaceous basalt.
(2) Ground or powdered cork or agave pulp.
(3) Portland cement.
(4) Sand (this may or may not be added.)

The proportions may be varied according to the strength desired and the purposes for which the finished product is to be used, but the following schedule indicates the proportions found best suited to the production of units and monolithic constructions:

|     |                 | Parts. |
| --- | --------------- | ------ |
| (1) | Basalt          | 1      |
| (2) | Cork            | 2      |
| (3) | Portland cement | 1      |
| (4) | Sand            | 1      |

In forming the composition the basalt rock is reduced, as by crushing, to small particles but it is not ground or powdered, as this would destroy the cellular structure of the stone and it is important such structure be preserved.

The cork is also reduced to small state and is mixed with the cement, water being added to form a mix and the cork particles are first stirred well to distribute same throughout the cement mix whereby a homogeneous mass is formed; to this mass, the crushed or broken basalt is added, the cement-cork mix bonding to the exterior cells of the basalt and the cement incorporating the ingredients and bonding tightly the globules of cork to the cells of scoriaceous basalt.

The cement is an ordinary binder. The scoriaceous basalt increases the bulk and strength of the material and brings to the final product all of its native properties.

Neither the cork nor pulp are subject to expansion by moisture which would set up internal stresses in the mass during the process of setting and they form and increase the cells in the mass of concrete, not endangering the integrity of the concrete as would happen if sawdust or fibrous material were used instead, it being well known that perfect crystallization of the cement will not take place if the mass is disturbed internally by movement of its particles or exteriorly by disturbance.

The cells must be increased mechanically by the inclusion within the mass of globules of compressible nonabsorbent, nonfibrous material.

This concrete is a globular, cellular concrete, the globular cells thus formed in the concrete comprising a large proportion of the mass and because of this shape their walls strongly resist deformation and fracture. The concrete is therefore light yet strong, sound and heat resisting and yet resembles ordinary concrete in appearance and constructive utility. It can be cast not only in forms in situ and reinforced with steel as is ordinary concrete but may be cast in suitable shape and dimensioned units and joined together in houses and like structures with nails, screws, bolts or other fasteners, as wood is ordinarily joined, by reason of the fact, that the walls of the globular cells are broken down, as for instance when a nail is driven into it, the mass of the nail taking the place of the aggregation of broken-down cells without splitting or similarly fracturing the concrete.

The cork is cell forming and sound proof, elastic and an insulation generally without adding substantially to the weight of the product and without materially increasing the weight of the scoriaceous basalt or destroying the lightness secured in the product by the use of this much desired stone.

The cork forms the elastic globules of the material and forms a composite mass with a close texture. The cork is compressible when the product is tooled or sawed, screwed or bolted and cushions the cell walls against any fracture spreading unduly and the cork also grips or clings to nails and other fastenings.

The final product can be perfectly colored, bonded or coated with cement mortars or other mortars and can be equally decorative and waterproof, as can the ordinary concrete, although it is itself not unduly subject to saturation by water.

What is claimed is:

An improved light, strong, porous building material comprising Portland cement, sand and scoriaceous basalt in substantially equal parts and ground cork in at least two parts to every part of the basalt, said basalt being reduced to small state short of powdered condition and having numerous small cells, said cement, sand and cork forming a mix to receive the cellular basalt and bonding only with the exterior cells of the basalt, leaving the inner cells unfilled, said cork being cellular to add to the cellular structure of the building material.

DANIEL GARZA.